Aug. 8, 1967  E. M. WEBER  3,335,241
PRESSURE ACTUATED ELECTRICAL SWITCH
Filed July 28, 1965
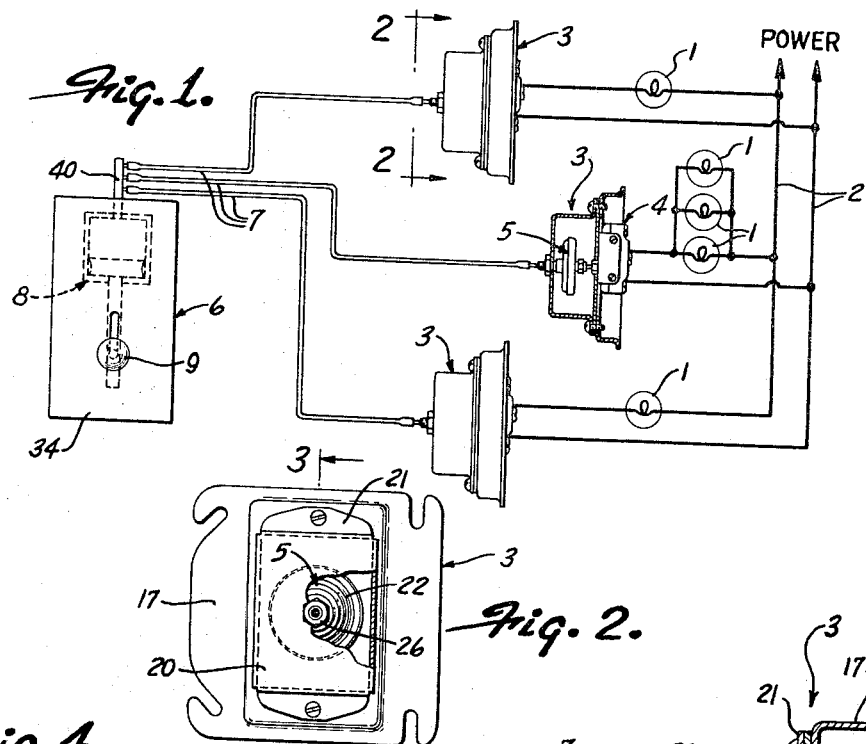
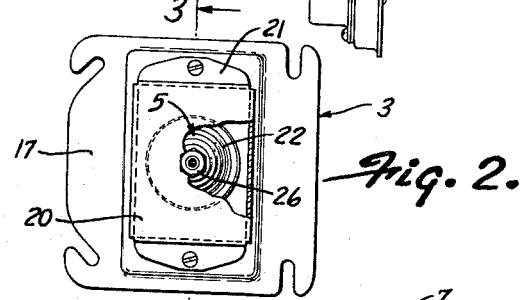
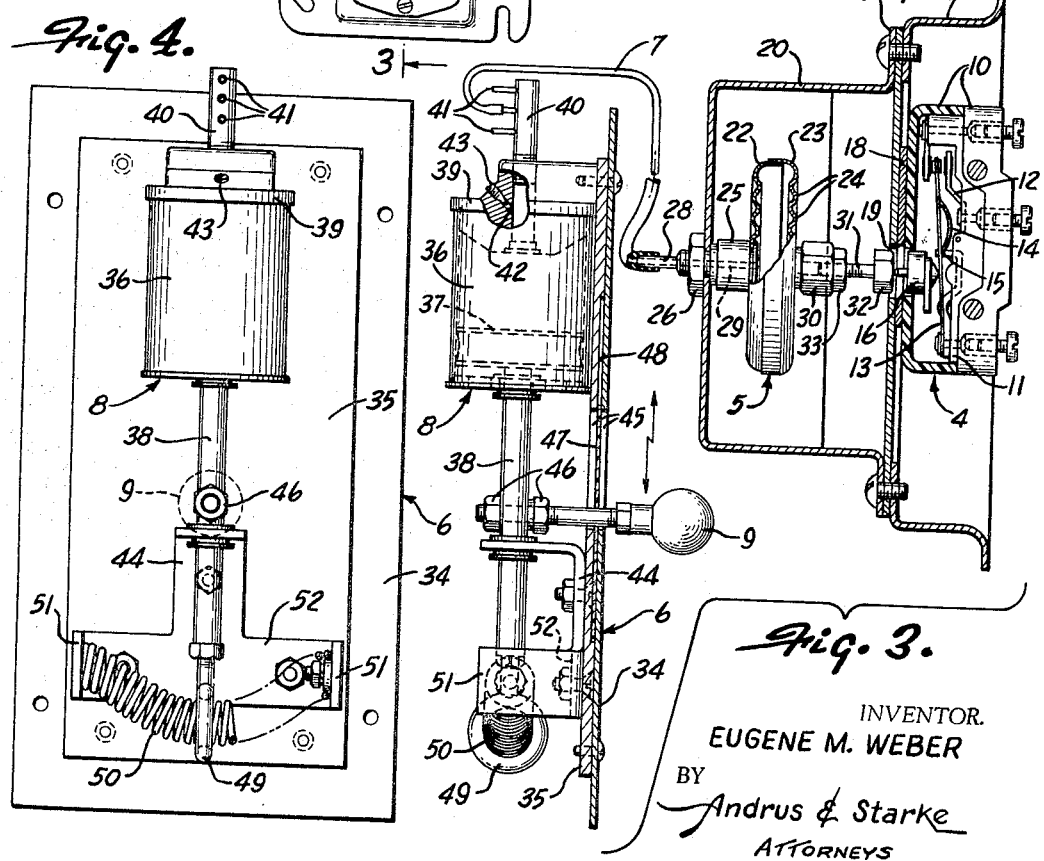
INVENTOR.
EUGENE M. WEBER
BY
Andrus & Starke
ATTORNEYS United States Patent Office 3,335,241
Patented Aug. 8, 1967

3,335,241
PRESSURE ACTUATED ELECTRICAL SWITCH
Eugene M. Weber, St. Francis, Wis., assignor to Johnson Service Company, Milwaukee, Wis., a corporation of Wisconsin
Filed July 28, 1965, Ser. No. 475,387
7 Claims. (Cl. 200—83)

This invention relates to a pressure actuating system for an electrical switch or the like and particularly to positioning of the switch in either of two alternate states in response to alternate application of relatively positive and negative pressure pulse signals.

One or more electrical devices may desirably be controlled from a remote location in certain applications. For example, a plurality of lights in one or more rooms may be actuated from a single wall-mounted control. Although the device can be connected directly by suitable wiring or by interconnecting relays, pneumatic controls have certain advantages. Generally however in connection with pneumatic control units, a relatively positive or negative pressure is established and maintained within a control chamber to provide the desired output positioning. This requires maintaining of the complete system under selected pressure conditions such that any leak or the like in the system may cause malfunctioning.

The present invention is particularly directed to a bistable pressure actuating means for an electric switch or the like having a remotely located pressure pluse source connected to one or more of the switches through a suitable pneumatic operator and including means urging the operator and switch to one stable state. The resetting force however is selected to be less than that required to actually reset the operator and switch. A first pressure signal to the operator moves the switch from the normal stable state. When the pressure signal is removed, the switch remains in the second stable state or position. A small opposite pressure signal causes the operator and switch to revert to the first or normal stable position where it remains even after the opposite pressure signal is dissipated or removed. This action is maintained by proper selection of the switch and the operator characteristics.

Thus, the present invention can employ a conventional snap action switch having a resilient loading means normally biasing the switch to an initial stable position and requiring a certain operating input force to move the switch from the normal position or first stable state. A pneumatic diaphragm operator is provided including a pressure chamber having at least one portion defined by a movable diaphragm or wall which is effectively connected through a suitable coupling means to the switch. The movable diaphragm or wall is resiliently loaded to a stable position tending to position the switch from its normal position. The force of the operator is insufficient however to overcome the force established by the snap action switch. The diaphragm operator is also connected through a suitable fluid tubing to a small pressure pump and means are provided to vent the operator to atmosphere or other ambient pressure. The pump is adapted to be rapidly operated to establish either a smal positive pressure pulse or alternately a small negative pressure pulse. When the small positive pressure pulse is applied through the air inlet to the diaphragm assembly, it creates an operating force sufficient with the normal spring force to move the switch from its normal standby position. The pressure in the chamber is then vented to the atmosphere. The switch however remains in the closed position because the release force provided by the switch is substantially less than the holding force provided by the actuated diaphragm. The low spring rate of the diaphragm will maintain enough holding force on the switch to maintain the switch in the actuated or second stable position. A small negative pressure pulse applied to the diaphragm assembly will reduce the spring force of the diaphgram sufficiently to allow the snap action switch to return to the normal standby position. By providing an adjustable connection between the diaphgram and the coupling to the switch, the device can be set to operate with essentially equal negative and positive pressure pulses if so desired or other pressure differential.

The present invention can be employed in any system employing a remote operator for an electric switch. For example, in a flexibly operated building lighting system, it may be desirable to control a plurality of lights from a single control unit. Each of the lighting fixtures or groups of fixtures would have one of the electrical switches in combination with the pressure actuator connected thereto. The plastic tubing would extend from each of the switch operators, for maximum flexibility, to a suitable pressure command device at the particular lighting control station. For example, the command device may be small hand operated piston and cylinder device such that moving the handle in one direction establishes a positive air pressure pulse and moving it in the opposite direction generates a corresponding negative air pressure pulse with a bleed or leak hole provided at the pump to dissipate the pressure pulse in a few seconds.

The present invention could also be highly advantageous in alarm systems and the like where the alarm signal releases a suitable stored air signal into the tubing system. The subsequent loss of the pressure would not reopen the switch. A manual reset lever would be provided in such an instance.

The present invention eliminates the need for electrical wiring and permits arranging of the controls through the simple expedient of connecting small diameter tubing to the several remotely located operators.

In accordance with the present invention, a bistable pressure electric switch is provided which includes a memory system which retains information as to the previous pressure signal applied and maintains the switch condition in accordance with the previous pressure application.

The drawing furnished herewith illustrates the best mode presently contemplated for carrying out the invention and clearly discloses the above advantages and features as well as others which will be clear from the following description of the drawing.

In the drawing:

FIG. 1 is a small diagrammatic view of a lighting system incorporating a plurality of lights controlled from a central control station in accordance with the present invention;

FIG. 2 is an enlarged end elevational view of an actuator shown in FIG. 1;

FIG. 3 is an enlarged vertical section of the pneumatic operator and pressure pulse pump shown in FIGS. 1 and 2; and FIG. 4 is a fragmentary view showing a latching structure for the positioning of the pump shown in FIG. 3.

Referring to the drawing and particularly to FIG. 1, the present invention has been illustrated in connection with a lighting system which might be incorporated in a suitable multiple unit building, not shown. Generally, the illustrated embodiment includes a plurality of lamps or lights 1 dispersed within a room or a plurality of different rooms and interconnected to a pair of power lines 2. The lights 1 are connected to the power lines through a switching units 3 constructed in accordance with the present invention. A plurality of lights 1 may be connected in parallel to a single unit 3, as shown in FIG. 1. Each unit 3 is similarly constructed and one of the units 3 in FIG. 1 is broken away to show an electrical switch 4 connected in series with the corresponding light 1 to the power lines 2. A pneumatic operator 5 forming a part of unit 3 is coupled to the electric switch 4 to close and open the switch. A central pressure pulse control 6 is provided at a remote location with respect to the lights 1 and the units 3. A plurality of separate fluid tubes or lines 7 extend from control 6 and are connected to the pneumatic operators 5. An individual line 7 may be connected to a single operator 5 or to a plurality of operators, although single connections as shown in FIG. 1 are preferred for maximum flexibility. A small hand-operated air pump 8 forms a part of control 6 and includes an operating handle 9 arranged for vertical reciprocation with means to latch it in a raised or lowered positon. As more fully developed hereinafter, raising of the handle 9 from the illustrated position generates a positive pressure pulse which is transmitted to each of the pneumatic operators 5 via tubes 7. Operators 5 actuate the corresponding switches 4 to a second stable state wherein the switch is closed. The pressure pulse applied to the operator 5 is rapidly dissipated through a suitable vent to atmosphere. The pneumatic operator 5 however, as hereinafter described, maintains the switch 4 in the closed position even after the pulse has been dissipated.

When the switches 4 are to be opened, the handle 9 is returned rapidly to the standby position to generate a negative pressure pulse in lines 7 to reset the operator 5, release the holding force on the electric switches 4 which return to the normal open state where they remain after removal of the negative pressure. More particularly, each switching unit 3 of the illustrated embodiment of the invention may be constructed as shown in greater detail in FIGS. 2 and 3. The electrical switch 4 is typically shown as a readily and commercially available spring-loaded snap action switch including a two-piece insulating housing 10 having contact terminals 11 and 12 secured in spaced relation within an end wall of the housing 10 and having outer screw type connection means. A contact leaf arm 13 is secured to the terminal 11 within housing 10 and projects through the housing with the free end thereof aligned with the inner portion of the terminal 12. The contact arm 13 is generally a strip-like member formed of a resilient material and having a central portion struck out and bent to define a spring member 14 extending from the spring and interengaged with a stop 15. The spring member 14 continuously urges the contact arm 13 in spaced relation to terminal 12 to maintain an open circuit position. A small operating plunger 16 is slidably mounted within the housing 10 and engages the central portion of the contact arm 13 such that a selected inward force overcomes the action of the force of spring member 14 and moves the contact arm 13 into engagement with terminal 12, thereby completing the circuit between the terminals 11 and 12. In the illustrated embodiment of the invention, the terminals 11 and 12 are connected in series with the associated light or lights 1.

The switch 4 is shown secured within the base of a cup-shaped mounting cover 17 by a small bracket 18 brazed or otherwise attached to the cover with the plunger 16 aligned with an opening 19 through which the pneumatic operator 5 is coupled to position the plunger 16.

The pneumatic operator 5 is shown as a known diaphragm assembly mounted within a cup-shaped mounting bracket 20 having flanges 21 secured to the back side of the cover 17 to properly position the pneumatic operator with respect to the switch opening 19. Generally, the pneumatic operator 5 includes a pair of shallow dish-shaped or concave metal members 22 and 23 one of which has a slightly larger diameter than the other. The side walls of members 22 and 23 are overlapped to define a substantially fluid-tight operating chamber. Each of the main parallel base walls of the metal members 22 and 23 is provided with a plurality of radial undulations 24 to provide a selected spring action or force.

A mounting hub 25 is secured to the face of the metal diaphragm 22 and includes a reduced threaded portion which projects outwardly through a suitable corresponding opening in the mounting bracket 20. A mounting nut 26 is threaded onto the outer end of the mounting hub 25 and secures the operator to the bracket 20. The mounting hub 25 terminates at its outermost end in a small coupling extension or tap 28 and includes a central opening 29 communicating with the chamber defined by the diaphragms. Line 7, shown as a small plastic tubing, is press fitted or otherwise secured such as by a suitable adhesive to the coupling tap 28 to connect the diaphragm chamber to the pump 8. Operation of the pump 8 provides the desired pressure pulses to the diaphragm chamber with a resultant outward and inward movement of the diaphragm 24.

A hub 30 is secured to the center of the diaphragm wall 24 and moves therewith. An adjusting screw 31 is threaded into a suitably tapped opening in hub 30 and extends axially outwardly therefrom in alignment with the plunger 16 of switch 4. The screw 31 terminates in an enlarged head 32 aligned with and slidably disposed through the opening 19 and positioned in engagement with the plunger 16. A lock nut 33 on the adjusting screw 31 is adapted to bear on the hub 30 and lock the adjustment screw 31 in predetermined relationship with respect to the plunger 16. In operation, the adjustment screw 31 is positioned to engage the plunger 16 with the diaphragm assembly in the unactuated position and to establish a slight opposing force in the diaphragm assembly tending to open switch 4. A positive pressure pulse applied to the diaphragm chamber causes the diaphragm wall 24 to move outwardly such that the plunger 16 moves inwardly of housing 10 and completes the circuit between terminals 11 and 12. When the pressure pulse is removed, the switch 4 remains in the closed or actuated state. This action results as the release force provided by leaf arm 13 of the switch 4 is less than the holding or opposing force of the diaphragm wall 24. The leaf arm 13 may tend to move and reset the plunger 16 very slightly but the force of leaf arm 13 is substantially less than the operating force and is therefore insufficient to overcome the retentive and opposing spring force of the diaphragm wall 24 which thereby holds the switch in the closed position. In practice, the release force of the switch may be about one half the operating force.

Subsequently, when a small negative pressure signal is applied to the air tap 28, the spring force of the diaphragm is reduced sufficiently to allow the leaf arm 13 to reset and open switch 4. The necessary holding force adjustment is determined by the adjusting screw 31 which determines the approximate negative and positive pressure pulse necessary to open and close the switch.

Although any suitable pressure pulse source might be employed, a suitable device for a switching circuit is shown in the drawing at 6. Generally, the illustrated control includes a mounting face plate 34 with the pump 8 secured to the back side thereof by a small mounting plate 35. The pump 8 includes a small cylinder 36 positioned with a vertical axis. A piston 37 is slidably disposed within the cylinder 36 and includes a shaft 38 projecting downwardly through the one end wall behind the mounting plate 34. The opposite end of cylinder 36 is provided with a centrally apertured head 39 to which a fluid distributor 40 is secured as by a suitable threaded connection. Distributor 40 includes a plurality of taps 41 one for each of the lines 7. Taps 41 not employed in a given system are sealed by suitable means.

A tapped bleed or leak opening 42 is provided in the head 39 of the cylinder 36 and selectively opened and closed by a control needle 43. When the shaft 38 is forced upwardly at a sufficiently rapid rate, the air within the cylinder 36 cannot flow outwardly through the opening 42 at a sufficiently rapid rate to maintain the normal pressure within the cylinder. Consequently, a selected pressure signal is generated within the cylinder 36 and transmitted through the header 40 and lines 7 to the respective switch operators 5. Similarly, when the shaft 38 is moved rapidly in the opposite direction, a negative pressure is generated within the cylinder 36 and impressed upon operators 5. The pressure signal rapidly dissipates through the leak opening 42.

The shaft 38 is guided for sliding reciprocal movement by a guide bracket 44. The handle 9 is a rod member which projects through the slot 45 in the base plate 34 and the mounting plate 55 and the inner end thereof is interconnected to the piston shaft 38. In the illustrated embodiment, the inner end of the handle is formed with a reduced threaded portion which projects through a corresponding diametrical opening in the shaft 38 with clamping nuts 46 secured to the opposite sides of the shaft.

The slots 45 in the plates 34 and 35 are coextensive and selected of a length to permit complete movement of the piston 37 between the opposite ends of the cylinder 36. Further, a cover plate 47 is secured to the handle 9 and mounted within a guide chamber 48 defined between the adjacent mating faces of plates 34 and 35. The cover card 47 projects from the opposite sides of the handle 9 a similar distance such that the slot 45 is maintained covered regardless of the position of the handle. This preventst he danger of having foreign material introduced into the assembly through the slot opening when the switch is moved to the extreme positions.

In order to insure generation of a pulse signal, the pump 8 is provided with a substantially snap action of the pisston 37 during the movement between the two extreme positions. In the illustrated embodiment of the invention, the lower end of the piston shaft 38 is provided with an eye-bolt 49 through which a compression coil spring 50 is secured. The opposite ends of the coil spring 50 are secured to the arms 51 of a U-shaped bracket 52, shown as an integral support for bracket 44. The bracket 52 is positioned such that the coil spring 50 is aligned with the arms 51 and fully compressed with the handle 9 centrally located within the slot 45 and piston 37 similarly located within the cylinder 36. Slight movement of spring 50 to either side of this center position causes the spring 50 to expand and rapidly snap the shaft 38 and the attached piston 36 to the one extreme or the other. This action insures movement of piston 36 at a sufficient rate to generate a minimum pressure pulse.

Assume the circuit and system is in the standby position shown in FIGS. 1 and 2 with the operating handle 9 positioned to the lower end of the operating slot 45 and the piston 37 to the lower end of the cylinder 36. The switches are in their normally open position with the head of the adjusting screw pressing on the plunger and with the arm 13 located by spring 14 to open the switch.

When it is desired to turn on the lights, the operator moves the handle upwardly which reaches the center position and then snaps to the opposite end position. The rapid movement of the piston 37 within the cylinder 36 generates a pressure signal which is impressed on each diaphragm chamber and forces the diaphragm wall 23 to move outwardly with a sufficient force to overcome the spring force of the wall and the leaf spring 14 of switch 4. The contact or leaf arm 13 moves to close the circuit between contacts 11 and 12. The pressure pulse rapidly dissipates through the bleed opening 42 at a rate determined by the setting needle 43. Normally, a couple of seconds will be sufficient. The contact arm 13 tends to return to its normally open position as a result of the action of spring 14. However, the low spring rate of the diaphragm walls 23 maintains a sufficient opposing force to hold the switch 4 closed.

When it is desired to turn off lights 1, the operator merely moves the handle 9 downwardly with the compression coil spring 50 being compressed to the center position and then rapidly expanding in the opposite direction to rapidly move the piston 37 away from the closure head 39. This generates a vacuum pulse within the cylinder 36 and the lines 7 to produce a corresponding vacuum pressure within the diaphragm chamber defined by walls 22 and 23 for a momentary period depending upon the setting of the bleed opening needle 43. The relatively negative pressure collapses the diaphragm walls inwardly to release the holding force on the switch contact arm 13 which therefore returns to the normally open circuit position. After the negative pressure signal disappears, the switch 4 remains in the standby position.

Although described, in a particular lighting arrangement, the switching control is applicable to any other electrical system. A manual override control can be provided at each switch to permit local operation or the like if desired. A two way switching arrangement can be readily provided by interconnecting of additional remotely located pumps and tubing to the respective control cylinders. In the latter application, the pressure of each of the pumps may generate a corresponding pressure in the other pump and the holding force of the coil spring of each pump must be such as to prevent movement thereof in response to the pressure force generated in the other pump.

The present invention provides a small pressure operated bistable switch unit for remote operation of electrical apparatus through a pneumatic pressure control piping system.

The specific embodiments of the several components shown are for purposes of illustration and may be varied in accordance with any desired structures to provide functioning in a similar manner within the broadest scope of the present invention. However, the illustrated components provide a highly satisfactory and operable embodiment of the invention.

Various modes of carrying out the invention are contemplated as being within the scope of the following claims particularly pointing out and distinctly claiming the subject matter which is regarded as the invention.

I claim:

1. A remote actuator for controlling an electrical circuit, comprising
    an electrical snap action switch having resilient means biasing said switch to a stable state, said resilient means having a release force less than the holding force,
    a diaphragm assembly including a metal diaphragm forming an outer wall of a chamber and having a fluid connector for connection of said chamber to a fluid source, said diaphragm having a selected spring force in excess of the release force and less than the holding force of the resilient means of said switch,
    an operating member secured to the diaphragm for movement therewith,
    means to vent said chamber to an ambient pressure, and
    pressure source means connected to the fluid connector and having means to apply a positive pressure pulse to said chamber to move said switch from said stable state, said diaphragm serving to hold said switch in said actuated state, said pressure source means having means to apply a negative pressure pulse to said chamber to return said switch to said stable state.

2. A remote actuator for controlling an electrical circuit, comprising
    an electrical snap action switch having resilient means biasing said switch to a stable state,
    a diaphragm assembly including a metal diaphragm forming an outer wall of a chamber having a fluid connector for connection to a fluid source and an operating member secured to the diaphragm for movement therewith, said diaphragm having a selected spring force in excess of the release force and less than the holding force of the resilient means of said switch,
    a hand pump having a pump chamber and a manually operable means to contract and expand the pump chamber to thereby respectively generate a positive pressure pulse and a negative pressure pulse, said pump having means to resiliently hold the manually operable means in two extreme operating positions, and means connecting said pump chamber to said diaphragm assembly and alternately applying positive and negative pressure pulses to said chamber to move said switch from said stable state and to return said switch to said stable state, said diaphragm serving to hold said switch in said actuated state.

3. A remote actuator for controlling an electrical circuit, comprising an electrical snap action switch having resilient means biasing said switch to a stable state, a diaphragm assembly including a metal diaphragm forming an outer wall of a chamber having a fluid connector for connection to a fluid source and an operating member secured to the diaphragm for movement therewith, said diaphragm having a selected spring force in excess of the release force and less than the holding force of the resilient means of said switch, a hand pump having a pump chamber and a manually operable means to contract and expand the pump chamber to thereby respectively generate a positive pressure pulse and a negative pressure pulse, said pump having means to resiliently hold the manually operable means in two extreme operating positions, header means connecting said pump chamber to said diaphragm assembly alternately applying positive and negative pressures to said chamber to move said switch from said stable state and to return said switch to said stable state, said diaphragm serving to hold said switch in said actuated state in response to a positive pressure, and a bleed means in said chamber to remove the pressure established by the manually operable means after a selected period sufficient to permit movement of the wall of the diaphragm assembly.

4. A remote actuator for controlling an electrical circuit, comprising an electrical snap action switch having resilient means biasing said switch to a stable state, a pressure chamber defined by a similarly telescoped cup-shaped metal diaphragm having a tubular mounting means secured to a first diaphragm and forming a fluid connector and an operating member secured to the second diaphragm for movement therewith, said second diaphragm having a selected spring force in excess of the release force and less than the holding force of the resilient means of said switch, a hand operated air pump having a pump chamber and a manually operable means to contract and expand the pump chamber to thereby respectively generate a positive pressure pulse and a negative pressure pulse, said pump having means to rapidly transfer the manually operable means to the opposite extreme in response to selected initial input movement and to resiliently hold the manually operable means in each extreme operating position, and means connecting said pump chamber to said fluid connector and applying a positive pressure pulse to said chamber to move said switch from said stable state and applying a negative pressure pulse to said chamber to return said switch to said stable state, the spring force of said second diaphragm serving to hold said switch in said actuated state.

5. A switch actuating system having a first switch position and a second switch position, comprising a switch having a first position and a second position, a pneumatic operator having a chamber and a movable member connected to said switch, a pressure source connected to said operator and forming a pressure operating system, said system having a connection to a reference pressure means and said source having a movable member having a first position to establish a positive pressure in said system and a second position to establish a negative pressure in said system, and said switch and said operator including means holding said switch in the first position and different means holding said switch in the second position with said chamber at reference pressure.

6. A remote actuator for an electrical switch system, comprising an electrical switch including a resilient means biasing the switch to a first stable position, said switch having an actuated nonstable position with respect to said first stable position, a pneumatic actuating means having a pressure chamber with a resiliently loaded movable wall means tending to move to a first stable position and establishing in such first stable position a force sufficient to hold said switch in the actuated nonstable position, means connecting the movable wall means to the switch and with the switch force in the stable position opposing the force established by the movable wall means, said switch force normally holding the movable wall means of the actuating means in an intermediate position spaced from said first stable position of the actuating means, a pressure pump connected to said pressure chamber and having a movable means to selectively create a positive pressure or a relative negative pressure with respect to a reference pressure within said pressure chamber, said one pressure causing said wall means of said actuating means to move in the direction of the switch force and the second pressure causing said wall means to move in the direction of the wall means force and thereby selectively establishing the switch between its first stable position and its actuated nonstable position, and means connected to the pressure chamber and pressure pump and dissipating the pressure to the reference level, said means requiring a selected time between establishment of the pressure within the pressure chamber from the complete dissipation thereof whereby said pressure exists in said chamber for a selected period sufficient to actuate said switch.

7. The remote actuator for an electrical switch system of claim 6 wherein said reference pressure means includes a metering opening connected to the pressure chamber and pressure pump unit to slowly bleed the system to atmospheric pressure as a reference.

References Cited

UNITED STATES PATENTS

| 2,831,084 | 4/1958 | Swinarski | 200—81.5 X |
| 2,875,291 | 2/1959 | Armstrong | 200—81 |
| 2,933,570 | 4/1960 | Tutthill | 200—81.5 X |
| 3,080,720 | 3/1963 | Downs | 800—81.5 X |

BERNARD A. GILHEANY, *Primary Examiner.*

H. B. GILSON, G. MAIER, *Assistant Examiners.*